(12) United States Patent
Wei et al.

(10) Patent No.: US 11,796,420 B2
(45) Date of Patent: Oct. 24, 2023

(54) BEARING MAINTENANCE TIMING ACQUISITION METHOD

(71) Applicant: Hunan Institute of Engineering, Xiangtan (CN)

(72) Inventors: Kexiang Wei, Xiangtan (CN); Xian Xiong, Xiangtan (CN); Wenxian Yang, Xiangtan (CN); Guanghui Zhu, Xiangtan (CN); Bo Qin, Xiangtan (CN)

(73) Assignee: Hunan Institute of Engineering, Xiangtan (CN)

( * ) Notice: Subject to any disclaimer, the term of this patent is extended or adjusted under 35 U.S.C. 154(b) by 307 days.

(21) Appl. No.: 17/309,365

(22) PCT Filed: Nov. 14, 2019

(86) PCT No.: PCT/CN2019/118512
§ 371 (c)(1),
(2) Date: May 21, 2021

(87) PCT Pub. No.: WO2020/103761
PCT Pub. Date: May 28, 2020

(65) Prior Publication Data
US 2022/0018733 A1    Jan. 20, 2022

(30) Foreign Application Priority Data
Nov. 22, 2018    (CN) .......................... 201811400523.X

(51) Int. Cl.
*G01M 13/045*    (2019.01)
*G06Q 10/20*    (2023.01)

(52) U.S. Cl.
CPC .......... *G01M 13/045* (2013.01); *G06Q 10/20* (2013.01)

(58) Field of Classification Search
CPC ..... G01M 13/045; G06Q 50/04; G06Q 10/00; G06Q 10/04; G06Q 10/20
(Continued)

(56) References Cited

U.S. PATENT DOCUMENTS

| 2008/0033695 A1* | 2/2008 | Sahara | G01H 1/003 702/185 |
| 2009/0093975 A1* | 4/2009 | Judd | G01H 13/00 702/56 |

FOREIGN PATENT DOCUMENTS

| CN | 102564759 A | 7/2012 |
| CN | 102831325 A | 12/2012 |

(Continued)

OTHER PUBLICATIONS

"International Application No. PCT/CN2019/118512, International Search Report and Written Opinion dated Feb. 19, 2020", (dated Feb. 19, 2020), 9 pgs.

*Primary Examiner* — John H Le
(74) *Attorney, Agent, or Firm* — Schwegman Lundberg & Woessner, P.A.

(57) ABSTRACT

Provided in the present invention is a bearing maintenance timing acquisition method: first, acquiring vibration signals of a bearing under different loads; then, respectively acquiring dimensionless parameters according to the vibration signal of each load; thus, acquiring predicted damage condition distribution data of the bearing under different loads according to the dimensionless parameters; and finally, obtaining accurate maintenance timing based on the predicted damage condition distribution data under different loads, so as to prolong the service life of the bearing while reducing maintenance costs.

4 Claims, 1 Drawing Sheet

(58) Field of Classification Search
USPC .......................................................... 702/184
See application file for complete search history.

(56) References Cited

FOREIGN PATENT DOCUMENTS

| | | | |
|---|---|---|---|
| CN | 102213116 B | * | 2/2015 |
| CN | 104568438 A | | 4/2015 |
| CN | 105445004 A | | 3/2016 |
| CN | 105975749 A | | 9/2016 |
| CN | 109919327 A | | 6/2019 |
| WO | WO-2020103761 A1 | | 5/2020 |

* cited by examiner

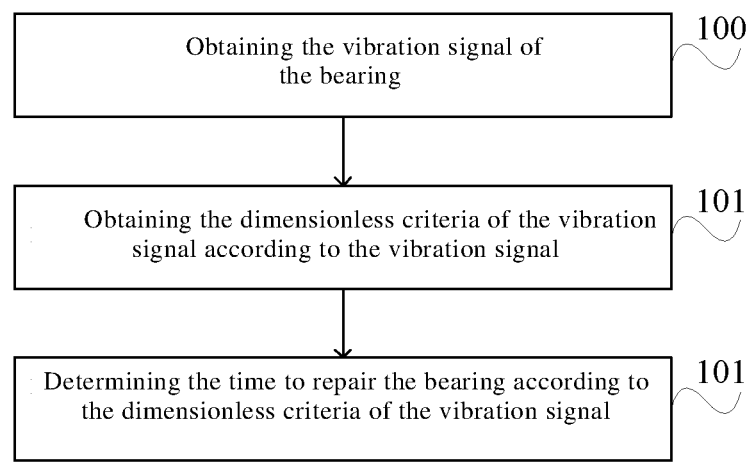

BEARING MAINTENANCE TIMING ACQUISITION METHOD

PRIORITY CLAIM TO RELATED APPLICATIONS

This application is a U.S. national stage filing under 35 U.S.C. § 371 from International Application No. PCT/CN2019/118512, filed on 14 Nov. 2019, and published as WO2020/103761 on 28 May 2020, which claims the benefit under 35 U.S.C. 119 to Chinese Application No. 201811400523.X, filed on 22 Nov. 2018, the benefit of priority of each of which is claimed herein, and which applications and publication are hereby incorporated herein by reference in their entirety.

BACKGROUND OF THE INVENTION

1. Technical Field

The present invention involves bearing technology, specifically, a method for determining the time to repair a bearing.

2. Description of Related Art

Bearing is a mechanical device widely used in various fields and industries. Failure or damage of it during the use will lead to the stoppage of production work and great repair costs.

In order to prolong the service life of the bearing, monitoring of the bearing condition during the use becomes particularly important. Conventionally, the monitoring of the bearing is achieved by the monitoring of its vibration. The core idea is: during the monitoring of the bearing vibration, when the vibration exceeds a certain threshold, it is judged that the bearing needs to be repaired. A variety of industrial standards have been proposed in the industry, with the purpose of determining the time to repair the bearing. For example, ISO IS 7919 recommends determining the time to repair the bearing by judging whether the vibration displacement of the bearing exceeds the vibration peak threshold. These industrial standards were originally used to provide general operating recommendations for the use and repair of machines and their components.

However, since the actual vibration of the bearing is affected by various environmental factors (for example, load, speed and temperature), through the existing condition monitoring mechanism, the time to repair the bearing is often inaccurate. If the time to repair the bearing is too early, the repair costs will increase; and if the time to repair the bearing is delayed, the service life of the bearing will be greatly reduced.

SUMMARY OF THE INVENTION

To address the technical issues left unsolved by the prior art, the present invention provides a method for determining the time to repair the bearing, which aims at reducing the repair cost and improving the service life of the bearing.

To address the foregoing technical issues, the present invention provides a technical scheme, wherein:
a method for determining the time to repair the bearing, comprising:
obtaining the vibration signal of the bearing;
obtaining the dimensionless criteria of the vibration signal according to the vibration signal;
determining the time to repair the bearing according to the dimensionless criteria of the vibration signal.

As further improvements on the foregoing technical scheme:
obtaining the dimensionless criteria of the vibration signal according to the vibration signal, specifically including:
obtaining the NIE of the vibration signal according to the vibration signal;
the NIE of the vibration signal satisfies the following formula:

$$NIE = -\sum_{k=1}^{M}(p_k \times \ln(p_k))$$

therein, $p_k$ represents the possible distribution of the vibration signal; the M is a natural number;
the $p_k$ satisfies the following formula:

$$p_k = \frac{n_k}{N} \times 100\% (k = 1, 2, \ldots, M)$$

therein, the $n_k$ represents the number of data in each element; the N represents the number of data contained in the vibration signal; the N satisfies the following formula:

$$N = \sum_{k=1}^{M} n_k$$

Obtaining the dimensionless criteria of the vibration signal according to the vibration signal, specifically including:
obtaining the J-Divergence of the vibration signal according to the vibration signal; the J-divergence represents the pseudo distance between two possible distribution points of the vibration signal;
if the two distribution points are $p_1$ and $p_2$ respectively, the J-Divergence satisfies the following formula:

$$J(p_1, p_2) = NIE\left(\frac{p_1 + p_2}{2}\right) - \frac{1}{2} \times [NIE(p_1) + NIE(p_2)]$$

Obtaining the dimensionless criteria of the vibration signal according to the vibration signal, specifically including:
obtaining the Kurtosis of the vibration signal according to the vibration signal; the Kurtosis satisfies the following formula:

$$K = \frac{1}{N}\sum_{i=1}^{N}\left(\frac{x_i - \bar{x}}{\sigma}\right)$$

therein, the $x_i$ represents the vibration signal i; the $\bar{x}$ and the $\sigma$ represent the standard deviation value of the vibration signal.

Obtaining the dimensionless criteria of the vibration signal according to the vibration signal, specifically including:
obtaining the mixed dimensionless criterion C of the vibration signal according to the vibration signal; the mixed dimensionless criterion C satisfies the following formula:

$$C = \sqrt{(\Delta NIE)^2 + (\Delta J)^2 + (\Delta K)^2}$$

therein, the $\Delta NIE=NIE_{present}-NIE_{reference}$; the $\Delta K=K_{present}-K_{reference}$; the $NIE_{present}$ represents the real-time NIE value; the $NIE_{reference}$ represents the reference value of NIE; the $K_{present}$ represents the real-time K value; the $K_{reference}$ represents the reference value of K.

The embodiment of the present invention provides a method for determining the time to repair the bearing. Firstly, the vibration signals of the bearing under different loads are obtained, and then based on the vibration signal under each load, the dimensionless criteria are obtained separately; according to the dimensionless criteria, the damage prediction distribution data of the bearing under different loads can be obtained. Finally, based on the damage prediction distribution data under different loads, an accurate time to repair the bearing is obtained, thereby reducing the repair cost and improving the service life of the bearing.

BRIEF DESCRIPTION OF THE DRAWINGS

FIG. 1 is a flow chart of a method for determining the time to repair the bearing according to an embodiment of the present invention.

DETAILED DESCRIPTION OF THE INVENTION

FIG. 1 a flow chart of a method for determining the time to repair the bearing according to an embodiment of the present invention. See FIG. 1 for the method, which includes the following steps:

step 100: obtaining the vibration signal of the bearing;
optionally, the vibration signals can be obtained separately for different loads of the bearing.
step 101: obtaining the dimensionless criteria of the vibration signal according to the vibration signal;
step 101: determining the time to repair the bearing according to the dimensionless criteria of the vibration signal.

The embodiment of the present invention provides a method for determining the time to repair the bearing. Firstly, the vibration signals of the bearing under different loads are obtained, and then based on the vibration signal under each load, the dimensionless criteria are obtained separately; according to the dimensionless criteria, the damage prediction distribution data of the bearing under different loads can be obtained. Finally, based on the damage prediction distribution data under different loads, an accurate time to repair the bearing is obtained, thereby reducing the repair cost and improving the service life of the bearing.

Optionally, the dimensionless criteria can be NIE, Kurtosis, J-Divergence and C.

Further, for the dimensionless criteria in Step 101, one possible way is:

obtaining the NIE of the vibration signal according to the vibration signal;
the NIE of the vibration signal satisfies the following formula:

$$NIE = -\sum_{k=1}^{M}(p_k \times \ln(p_k))$$

therein, $p_k$ represents the possible distribution of the vibration signal; M is a natural number;

$p_k$ satisfies the following formula:

$$p_k = \frac{n_k}{N} \times 100\% (k=1, 2, \dots, M)$$

therein, $n_k$ represents the number of data in each element; N represents the number of data contained in the vibration signal; N satisfies the following formula:

$$N = \sum_{k=1}^{M} n_k$$

optionally, the J-Divergence of the vibration signal can be obtained according to the vibration signal; the J-Divergence represents the pseudo distance between two possible distribution points of the vibration signal.

If the two distribution points are $p_1$ and $p_2$ respectively, the J-Divergence satisfies the following formula:

$$J(p_1, p_2) = NIE\left(\frac{p_1+p_2}{2}\right) - \frac{1}{2} \times [NIE(p_1) + NIE(p_2)]$$

optionally, the Kurtosis of the vibration signal can be obtained according to the vibration signal; the Kurtosis satisfies the following formula:

$$K = \frac{1}{N}\sum_{i=1}^{N}\left(\frac{x_i - \bar{x}}{\sigma}\right)$$

therein, $x_i$ represents the vibration signal i; $\bar{x}$ and $\sigma$ represent the standard deviation value of the vibration signal.

Optionally, the mixed dimensionless criterion C of the vibration signal can be obtained according to the vibration signal; the mixed dimensionless criterion C satisfies the following formula:

$$C = \sqrt{(\Delta NIE)^2 + (J)^2 + (\Delta K)^2}$$

therein, $\Delta NIE=NIE_{present}-NIE_{reference}$; $\Delta K=K_{present}-K_{reference}$; $NIE_{present}$ represents the real-time NIE value; $NIE_{reference}$ represents the reference value of NIE; $K_{present}$ represents the real-time K value; $K_{reference}$ represents the reference value of K.

A final note is made as follows: the above embodiments are only used to illustrate the technical solutions of the present invention, not to limit them; although the present invention has been described in detail with reference to the foregoing embodiments, the general technicians in this field should understand: they are still allowed to modify the technical solutions illustrated in the foregoing embodiments, or equivalently replace some or all of the technical features; and these modifications or replacements do not make the essence of the corresponding technical solutions deviate from the scope of technical solutions in the embodiments of the present invention.

What is claimed is:

1. A method for determining a time to repair a bearing, comprising:
   obtaining a vibration signal of the bearing;
   obtaining a dimensionless criteria of the vibration signal based on the vibration signal;

determining a time to repair the bearing according to the dimensionless criteria of the vibration signal; and
repairing the bearing once the determined time is reached;
wherein obtaining the dimensionless criteria of the vibration signal based on the obtained vibration signal includes:
obtaining a NW of the vibration signal according to the vibration signal;
the NW of the vibration signal satisfies the following formula:

$$NIE = -\sum_{k=1}^{M}(p_k \times \ln(p_k))$$

therein, $p_k$ represents the possible distribution of the vibration signal; the M is a natural number;
the $p_k$ satisfies the following formula:

$$p_k = \frac{n_k}{N} \times 100\% (k = 1, 2, \ldots, M)$$

therein, the $n_k$ represents the number of data in each element; the N represents the number of data contained in the vibration signal; the N satisfies the following formula:

$$N = \sum_{k=1}^{M} n_k.$$

2. The method for determining the time to repair the bearing of claim 1, wherein obtaining the dimensionless criteria of the vibration signal based on the obtained vibration signal includes:
obtaining a J-Divergence of the vibration signal according to the vibration signal; the J-divergence represents the pseudo distance between two possible distribution points of the vibration signal;
where two distribution points are $p_1$ and $p_2$ respectively, the J-Divergence satisfies the following formula:

$$J(p_1, p_2) = NIE\left(\frac{p_1 + p_2}{2}\right) - \frac{1}{2} \times [NIE(p_1) + NIE(p_2)].$$

3. The method for determining the time to repair the bearing of claim 2, wherein obtaining the dimensionless criteria of the vibration signal based on the obtained vibration signal includes:
obtaining the Kurtosis of the vibration signal according to the vibration signal; the Kurtosis satisfies the following formula:

$$K = \frac{1}{N}\sum_{i=1}^{N}\left(\frac{x_i - \bar{x}}{\sigma}\right)$$

therein, the $x_i$ represents the vibration signal i; the $\bar{x}$ and the $\sigma$ represent the standard deviation value of the vibration signal.

4. The method for determining the time to repair the bearing of claim 3, wherein obtaining the dimensionless criteria of the vibration signal based on the obtained vibration signal, includes:
obtaining a mixed dimensionless criterion C of the vibration signal according to the vibration signal; the mixed dimensionless criterion C satisfies the following formula:

$$C = \sqrt{(\Delta NIE)^2 + (J)^2 + (\Delta K)^2}$$

therein, the $\Delta NIE = NIE_{present} - NIE_{reference}$; the $\Delta K = K_{present} - K_{reference}$; the $NIE_{present}$ represents the real-time NIE value; the $NIE_{reference}$ represents the reference value of NIE; the $K_{present}$ represents the real-time K value; the $K_{reference}$ represents the reference value of K.

* * * * *